(12) United States Patent
Ladd et al.

(10) Patent No.: US 8,270,720 B1
(45) Date of Patent: Sep. 18, 2012

(54) METHOD AND SYSTEM FOR SECURE DATA ENTRY

(75) Inventors: Steven Kif Ladd, North Andover, MA (US); Mark Andrew Robinson, Atkinson, NH (US); Depankar Neogi, Wilmington, MA (US); Dilnawaj Ahmed, Bangalore (IN)

(73) Assignee: Gruntworx, LLC, Franklin, NC (US)

( * ) Notice: Subject to any disclaimer, the term of this patent is extended or adjusted under 35 U.S.C. 154(b) by 953 days.

(21) Appl. No.: 11/708,201

(22) Filed: Feb. 20, 2007

Related U.S. Application Data

(60) Provisional application No. 60/775,239, filed on Feb. 21, 2006.

(51) Int. Cl.
*G06K 9/46* (2006.01)

(52) U.S. Cl. .............. 382/190; 705/31; 715/273

(58) Field of Classification Search .............. 382/176, 382/181, 305, 190; 707/100; 705/31; 706/10; 715/273
See application file for complete search history.

(56) References Cited

U.S. PATENT DOCUMENTS

| 6,741,737 | B1 * | 5/2004 | Lenoir .......................... 382/176 |
| 7,000,179 | B2 * | 2/2006 | Yankovich et al. ........... 715/222 |
| 7,415,471 | B1 * | 8/2008 | Coleman ............................... 1/1 |
| 7,426,496 | B2 * | 9/2008 | Kristjansson ................... 706/10 |
| 7,590,572 | B2 * | 9/2009 | Larson ............................ 705/31 |
| 7,661,065 | B2 * | 2/2010 | Nickolov et al. ............. 715/273 |
| 2007/0133876 | A1 * | 6/2007 | Chande et al. ................. 382/181 |
| 2010/0161460 | A1 * | 6/2010 | Vroom et al. ................... 705/31 |

* cited by examiner

*Primary Examiner* — Gregory M Desire
(74) *Attorney, Agent, or Firm* — Chambliss, Bahner & Stophel, P.C.

(57) ABSTRACT

The present invention includes a method of secure data entry that enables complex data entry work to be performed by unskilled workers that results in data entry with higher productivity, higher quality and higher security than data entry performed by highly skilled workers. The invention identifies data fields on an electronic image of an identified input page, sequences identified data field images, and individually displays data field images for manual data entry. The invention also provides for extracting data from a data field image and displaying extracted data along with the corresponding data field image for approval or correction. Sequenced data field images are optionally reordered or randomized for display and manual entry.

17 Claims, 2 Drawing Sheets

Input document        Extracted data fields        Manual data entry

METHOD AND SYSTEM FOR SECURE DATA ENTRY

CROSS-REFERENCE TO RELATED APPLICATIONS

This utility patent application claims priority from U.S. provisional patent application Ser. No. 60/775,239 filed Feb. 21, 2006, titled "Method and Apparatus for Secure Data Entry" in the name of Steven K. Ladd and Mark A. Robinson.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2007 Copanion, Inc.

BACKGROUND OF THE INVENTION

1. Field of the Invention

This invention relates generally to entering data into computer systems, and relates particularly to secure data entry from source document images.

2. Description of Prior Art

Data on millions of documents are entered into computer systems every year. The documents may include machine printed and/or hand-written data.

The data are entered on behalf of banks, insurance companies, financial advisors, tax preparers, legal firms, security firms, mortgage brokers, credit card issuers, wholesalers, distributors, retailers, transportation companies, utilities, health care providers, employers, schools, churches, nonprofit organizations, clubs, individuals, governmental entities and other organizations. The data are entered by domestic and offshore employees, temporary workers and outsourcing firms.

Data entry can be primarily clerical in nature, such as in inputing information on magazine subscription forms. Data entry can also be an essential portion of larger technical tasks, such as preparing income tax returns, processing mortgage applications or handling insurance claims.

There are three general methods of performing data entry: conventional, outsourcing and automation.

Conventional data entry, the first method, requires workers with specific education, domain expertise, particular training, software knowledge and/or cultural understanding. Data entry workers must recognize documents, find relevant information on the documents and enter the data appropriately and accurately in particular software programs. Such manual data entry is complex, time-consuming and error-prone. As a result, the cost of data entry is often quite high; this is especially true, for example, when the data entry is performed by lawyers, accountants, physicians and other highly paid professionals as part of their work.

Conventional data entry also exposes all documents in their entirety to data entry workers. These documents may have sensitive information related to individuals' and organizations' financial, tax, health, insurance, employment, education, family, legal and/or other matters.

The second method, outsourcing, requires the same worker education, expertise, training, software knowledge and/or cultural understanding. As with conventional data entry, data entry workers must recognize documents, find relevant information on the documents and enter the data appropriately and accurately in particular software programs. As with conventional data entry, outsourcing is manual and, therefore, complex, time-consuming and error-prone. Outsourcing firms such as Accenture, EDS, IBM, Infosys, Tata, and Wipro, often reduce costs by offshoring data entry work to locations with low wage data entry workers. For example, data entry of US tax and financial data is a function that has been implemented using thousands of well-educated, English-speaking workers in India and other low wage countries.

The first step of outsourcing requires organizations to scan financial, tax, health and/or other documents and save the resulting image files. These image files can be accessed by data entry workers via several methods. One method stores the image files on the source organizations' computer systems; the data entry workers view the image files over networks (such as the Internet or private networks). Another method stores the image files on third-party computers systems; the data entry workers view the image files over networks. An alternative method transmits the image files from source organizations over networks and stores the image files for viewing by the data entry workers on the data entry organizations' computer system.

For example, an accountant may scan the various tax forms containing client financial data and transmit the scanned image files to an outsourcing firm. An employee of the outsourcing firm reads the client financial data and enters it into an income tax software program. The resulting tax software data file is then transmitted back to the accountant.

Quality problems with offshore data entry work have been reported by many customers. Outsourced service providers address these problems by hiring better educated and/or more experienced workers, providing them extensive training, entering data two or more times and/or exhaustively checking their work for quality errors. These measures reduce the cost savings expected from offshore outsourcing.

The cost of offshore labor is going up as demand increases for their services. Indian employers report 20% and greater salary increases over the past year.

Outsourcing and offshoring are accompanied with concerns over security risks associated with fraud and identity theft. These security concerns apply to employees and temporary workers as well as outsourced workers and offshore workers who have access to documents with sensitive information.

Although the transmission of scanned image files to the data entry organization may be secured by cryptographic techniques, the sensitive data and personal identifying information are in the clear, i.e., unencrypted, when read by data entry workers prior to entry in the appropriate computer systems. Data entry organizations publicly recognize the need for information security. Some data entry organizations claim to investigate and perform background checks of employees. Many data entry organizations claim to strictly limit physical access to the rooms in which the employees enter the data; and such rooms may be isolated. Additionally, employees may be subject to inspection to ensure that nothing is copied or removed, and paper, writing materials, cameras or other recording technology may be forbidden in the rooms. Such seemingly comprehensive security precautions are primarily physical in nature, and they are imperfect.

Lapses in physical security can occur. For example, Social Security numbers and bank routing numbers are only nine digits; bank account numbers are usually of similar length. Memorization of these important numbers would not be difficult and would allow a nefarious employee to have direct access to the money held in those accounts; in 2004, employees of MphasiS in Pune, India stole $426,000 from Citibank customers. The owners, managers, staff, guards and contractors of data entry organizations may misuse some or all of the unencrypted confidential information in their care. Further, breaches of physical and information system security by external parties can occur. Because data entry organizations are increasingly located in foreign countries, there is often little or no recourse for American citizens victimized in this manner.

For five consecutive years, the Top Technology Initiatives survey of the American Institute of Certified Public Accountants (AICPA) identified information security as the technology initiative expected to have the greatest effect in the upcoming year. Laws have been enacted and new legislation and regulations have been proposed to address these security concerns, particularly those related to outsourced data entry that is performed offshore.

The third general method of data entry involves partial automation, often combining optical character recognition, human inspection and workflow management software.

The first step of automation is to scan financial, tax, health and/or other documents and save the resulting image files. The scanned images are compared to a database of known documents. Images that are not identified are routed to data entry workers for conventional processing; images that are identified have data extracted using optical character recognition (OCR.)

Optical character recognition is not without errors, often mistaking one percent or more of the characters. Such an error rate is often unacceptable as it would result in more than six mistakes on a typical US personal income tax return with more than 100 fields of data averaging more than six letters and/or digits each.

Human inspection is required to correct the errors. Inspection requires workers with specific education, domain expertise, particular training, software knowledge and/or cultural understanding. Inspection workers must recognize documents, find relevant information on the documents and insure that the extracted data has been appropriately and accurately displayed in particular software programs. Typically, any changes made by inspection workers must be reviewed and approved by other, more senior, inspection workers before replacing the data extracted by optical character recognition.

Because automation requires human inspection, source documents with sensitive information are exposed in their entirety to data entry workers.

While the prior art attempts to reduce the cost of data entry through the use of low cost labor and limited automation, none of the above methods of data entry (1) eliminates the requirements of education, domain expertise, training, software knowledge and/or cultural understanding, (2) minimizes the time spent entering and quality checking the data, (3) minimizes errors and (4) protects the privacy of the owners of the data without being dependent on the security systems of data entry organizations. What is needed, therefore is a method of performing data entry that overcomes the above-mentioned limitations and that includes the features enumerated above.

BRIEF SUMMARY OF THE INVENTION

The present invention enables complex data entry work to be performed by unskilled workers with higher productivity, higher quality and higher security than highly skilled workers.

The invention takes images of scanned documents and breaks the images into small pieces called "confetti." Each piece of confetti contains a single data entry field. For example, on a Form W-2, one piece of confetti would contain an employee name, another would contain a Social Security number, a third would contain wages, and so on.

The invention mixes the confetti such that, even if someone had access to all of the confetti, no sensitive information could be reassembled from all the pieces of the original documents.

The invention distributes the confetti to data entry workers per predetermined rules: Social Security numbers might be entered only in the United States, some workers might be restricted to enter only numbers and so on.

Data can be extracted from each piece of confetti using OCR or similar techniques. The confetti image and optional extracted data are presented to unskilled data entry workers who either approve the extracted value or enter the correct data. Thus, the user interface for all types of data entry can be the same.

Thus, the invention combines automation and human quality checking to perform data entry at minimum cost and with maximum security. The invention applies to virtually all document-based data entry applications.

As a data entry system, the invention may be integrated with or operate as a component of a larger information processing system. An information processing system using the present invention may process more than one type of document of one or more pages each and/or further process entered data into files, databases, reports and/or computer programs.

FEATURES AND ADVANTAGES

An advantage of this invention is that it eliminates worker education, domain expertise, training, software knowledge and/or cultural understanding requirements. The invention streamlines all data entry to viewing a portion of a document image (the confetti) and either entering its value into a computer system or approving the extracted value.

Another advantage of the invention is that it minimizes data entry time. The invention focuses data entry work on the image to be entered and its value. It eliminates time spent locating a data field on a document, often flipping through physical papers or scrolling computer windows, thinking about how and where the value should be entered and interacting with software programs.

Another advantage is that the invention minimizes quality checking time. The invention simplifies quality checking to comparing images to values.

Another advantage is that the invention minimizes data entry errors. The invention eliminates all data entry and quality checking tasks other than comparing images to values.

Another advantage is that the invention protects the privacy of the owners of sensitive information without relying on the security systems of data entry organizations. The invention divides sensitive documents into multiple pieces of confetti or slices which cannot be correlated to each other.

BRIEF DESCRIPTION OF THE DRAWINGS

Processes, states, statuses, and databases are named for their respective functions.

DETAILED DESCRIPTION OF THE INVENTION, INCLUDING THE PREFERRED EMBODIMENT

Operation

In the following detailed description of the invention, reference is made to the accompanying drawings which form a part hereof, and in which are shown, by way of illustration, specific embodiments in which the invention may be practiced. It is to be understood that other embodiments may be used, and structural changes may be made without departing from the scope of the present invention.

Figure 1:
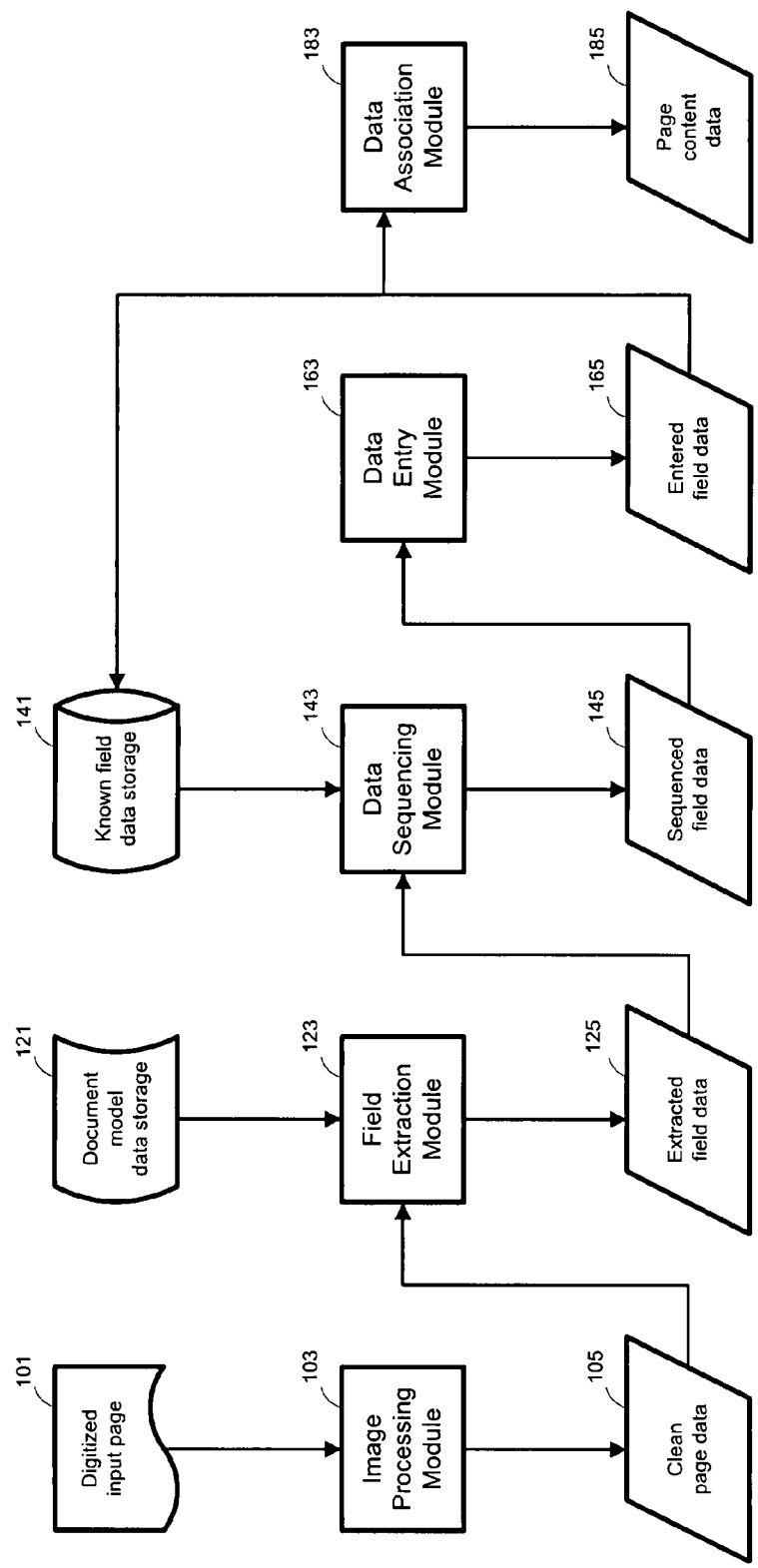
FIG. 1 is a block diagram of the overall secure data entry system.

FIG. 1 shows the process of securely entering data on a digitized input page of a known type. Input data are provided as a digitized input page 101 to an image processing module 103.

Digitized input page 101 is any page that has been identified such that data fields within the identified page are located. Digitized input page 101 may be accounting, bookkeeping, or credit reports; tax forms; banking, brokerage, or loan documents; employment, insurance, or mortgage applications; health or legal papers; various spreadsheets; the output of various data and/or word processing applications; or a variety of other standard or custom forms, documents, or pages. For example, digitized input page 101 may be a 2006 Form W-2 produced by Automatic Data Processing, Inc. of Roseland, N.J.

Digitized input page 101 may include data fields that are machine printed, such as found on Form W-2, HUD-1, HCFA-1500 or many other forms. Digitized input page 101 may include data fields that are hand-printed or hand-written, such as found on health care questionnaires and employment applications. Additionally, digitized input page 101 may have data fields that appear as squares, boxes, ovals, circles and/or other elements that may contain non-character markings. Digitized input page 101 may have a plurality of types of data fields in any combination.

In some cases, digitized input page 101 may be received in an encrypted format to be unencrypted upon receipt.

Digitized input page 101 may have been rotated, skewed, scaled, speckled or otherwise marred during digitization. Digitized input page 101 may have shaded regions. Image processing module 103 electronically rotates, straightens, scales, deshades, despeckles and otherwise provides image processing of digitized input page 101 to provide a clean page data 105. Alternatively, image processing module 103 may not be necessary if digitized input page 101 is properly aligned and in good condition.

Fields must be extracted for each page type. Document model data storage 121 includes as data the identity of fields on each page type and the rules for determining location of the fields on each page type. Typically, document model data storage 121 includes location data and/or rules for determining location data from clean page data 105. One example of such a location data format is a set of two or more (x,y) coordinates.

In one embodiment, a set of (x,y) coordinates of a field is determined relative to a predefined origin, such as a corner of the scanned page data or a predefined and recognized marker. For example, in this embodiment, the wage field on a W-2 is determined by a pair of (x,y) coordinates relative to the upper left corner of the scanned page data of a W-2.

In another embodiment, a set of (x,y) coordinates of a field is determined relative to content per rules. For example, in this embodiment, the wage field on a W-2 is determined by the locations of text beginning with "Wages" and line geometries. In this embodiment, electronic recognition of text and geometries is performed before the fields are extracted. A variation of this example that identifies spreadsheet-style data, table-style data or other predetermined data forms, alone or in combination with recognized content, in determining data fields is also included in this embodiment. A combination of the above two embodiments may be used as well.

Clean page data 105 and document model data storage 121 are provided to field extraction module 123. Field extraction module 123 extracts desired data from clean page data 105 and produces extracted field data 125. Extracted field data 125 consists of field type data, a set of one or more extracted images, and corresponding page identification and field identification of each image.

Manipulations of extracted field data 125 are possible. One such manipulation splits extracted field data 125 into two or more subfields. For example, a name "John Smith" may be split into "John" and "Smith." "John" may be further split into "J", "o", "h", and "n". For example, e-mail addresses may be split at the "at" sign ("@"). For example, Social Security numbers may be split at the dashes ("-"); numbers may be split into individual digits as well. Extracted field data 125 may be split into any plurality of subfields.

Data sequencing module 143 reorders extracted field data 125 so that data fields cannot be associated to one another during data entry. Data sequencing module 143 randomizes and/or separates extracted field data 125.

In one embodiment, data sequencing module 143 randomizes the data from a single page. For example, data extracted from an individual's W-2 may include data such as the taxpayer's name, address, Social Security number, and wages. When provided in the same order for each individual, and particularly if the data fields are not split into multiple subfields, the data may be easily linked and intercepted by a nefarious individual as discussed above. By randomizing the order of the data, and particularly if the data fields are split into multiple subfields, then data is not easily linked and is more difficult to intercept.

In another embodiment, data sequencing module 143 randomizes the data from a plurality of pages, all of the same page type, all of which are from a single source.

In another embodiment, data sequencing module 143 takes data provided and randomizes the data from a plurality of pages, all of the same page type, in which the pages are from a plurality of sources.

In another embodiment, the data sequencing module 143 takes the data provided and randomizes the data from a plurality of pages in which the pages are of a plurality of page types, all of which are from a single source. For example, an individual may provide one or more W-2s, 1099-INTs, etc. By randomizing the order of the data from all of the forms provided, and particularly by splitting data fields into multiple subfields, it becomes nearly impossible to link and intercept the data.

In another embodiment, data sequencing module 143 takes data provided and randomizes the data from a plurality of pages in which the pages are of a plurality of page types and in which the pages are from a plurality of sources. For example, two or more individuals may provide one or more W-2s, 1099-INTs, etc. By randomizing the order of the data from all of the forms provided and randomizing the data among the plurality of individuals, it would be nearly impossible to link the data to both identify the proper individual's data and to intercept desired data of a particular individual. In addition, even if a person were to intercept much of the data from a plurality of individuals, the number of combinations of the data would make the process of identifying a particular individual's data even more difficult.

In another embodiment, data sequencing module 143 takes the data provided and separates the data into a plurality of sets of data to be seen by separate data entry organizations and/or workers. For example, names and Social Security numbers would be separated into different sets of data so that names would be entered by one data entry organization and Social Security numbers would be entered by a different data entry organization.

Data sequencing module 143 optionally randomizes and separates extracted field data 125 in any combination. Data sequencing module 143 optionally sequences extracted field data 125 in batches or continuously. Alternatively, data may be encrypted and the encrypted data presented to data entry workers for entry into the system. For encrypting data, data sequencing module 143 includes an encryption mode.

Data sequencing module 143 provides sequenced field data 145 to data entry module 163. Data entry module 163 displays sequenced field data 145 on a computer monitor to a data entry worker. A data entry worker inputs displayed data into the system manually using a keyboard, voice recognition system, or other input device. Data entry module 163 produces entered field data 165.

Figure 2:
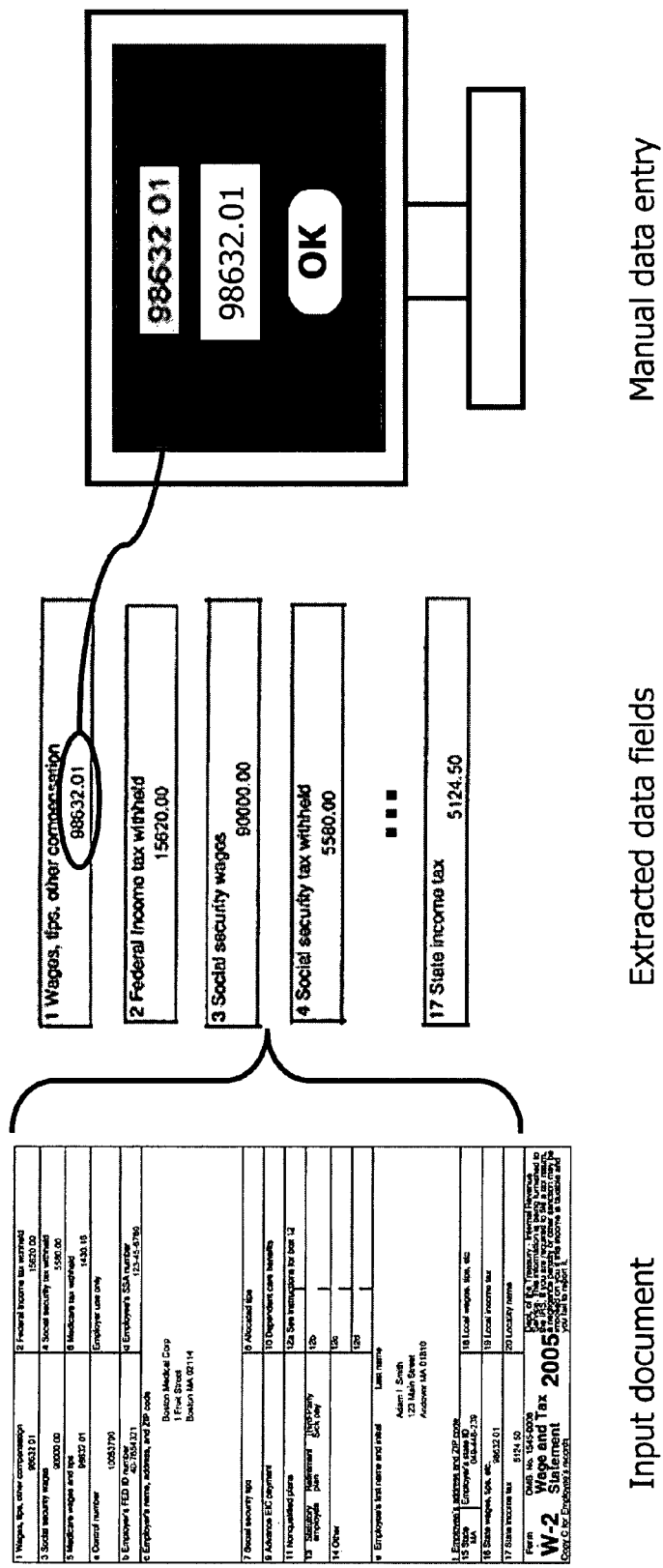
FIG. 2 is an illustration of an embodiment of the present invention.

FIG. 2 illustrates the secure data entry process with an example input document, extracted data fields and one corresponding embodiment of a manual data entry computer screen.

In one embodiment, data entry module 163 displays sequenced field data 145 to a single data entry worker one field at a time.

In another embodiment, data entry module 163 displays sequenced field data 145 to a plurality of data entry workers one field at a time.

In another embodiment, data entry module 163 displays sequenced field data 145 to a single data entry worker, multiple fields at a time, in which all fields are the same type.

In another embodiment, data entry module 163 displays sequenced field data 145 to a single data entry worker, multiple fields at a time, in which the fields are a plurality of types.

In another embodiment, data entry module 163 displays sequenced field data 145 to a plurality of data entry workers, multiple fields at a time, in which all fields are the same type.

In another embodiment, the data entry module 163 displays sequenced field data 145 to a plurality of data entry workers, multiple fields at a time, in which the fields are a plurality of types.

Additionally, for each of the above cases, data entry module 163 may display sequenced field data with corresponding recognized content data. In such cases, a data entry worker either may approve recognized content data or may enter a different value.

Alternatively, data entry module 163 employs image recognition methods such as optical character recognition (OCR), intelligent character recognition (ICR), optical mark recognition (OMR), barcode recognition, and/or other recognition techniques. This image recognition step has its range of possible values restricted by the nature of the field type data. For example, a field that has been identified as containing "wage" type data on a W-2 is known to contain only numeric values. These content data recognized by data entry module 163 may override originally recognized content values.

Quality assurance in the data entry process is an important consideration. Data that is incorrectly entered may have negative financial, health, security or other consequences. Data entry module 163 may include, in one instance, a comparator that receives recognized data and data entered by a data entry worker. If the data are not the same, an alarm is set and the data flagged for review by another image recognition method or data entry worker.

In another embodiment, a buffer is provided to provide each data entry worker with a queue of data to be entered. This allows each data entry worker to be more fully utilized and to allow for brief interruptions in a network that provides the data to the data entry worker.

Optionally, the invention also includes known field data storage 141 which includes as data generated images whose values are known. Known field data storage 141 may also include actual extracted field data whose values have been validated. Use of actual data reduces system requirements by not requiring field data to be generated. Generated field data and/or reused actual data may be used for quality checking. Known field data storage 141 provides data sequencing module 143 inputs that are in addition to those from extracted field data 125. By adding data that has been fabricated and/or adding data that is unrelated to the set of data being entered, the likelihood of linking and intercepting data is further reduced. By providing known data in sequenced field data 145 to particular data entry workers and monitoring the results, the quality of each worker's data entry can be monitored.

Entered field data 165 is provided to data association module 183. Data association module 183 integrates randomized and/or separated data after entry. Data association module 183 places entered field data 165 in the proper format and into page content data 185. Page content data 185 is any desired database, file, report, document or form for storage, review, and/or further processing.

In addition, data association module 183 includes a decryption module to decrypt any encrypted data. Moreover, data association module 183 includes a module to recombine split subfields into a single useable field for those data fields have been separated into two or more subfields.

Other Embodiments

As will also be apparent to those skilled in the art, the secure data entry system encompasses alternate embodiments of the software program in which the functions of the system are performed by modules different than those shown in the FIG. 1. The software program may be written in one of several widely available programming languages, and the modules may be coded as subroutines, subsystems, or objects depending on the language chosen. Similarly, data in document model data storage 121 and in known field data storage 141 are described and represented as logical records embodied in a database but the invention is not limited to the described arrangement of data records, nor is the use of any particular type of data management system implied. Relational database systems from vendors such as Oracle, Sybase, IBM, or Microsoft provide the necessary infrastructure for managing underlying data in the system, whether it is centralized or distributed, but other organizational data structures, e.g. indexed flat files or XML-based data structures, may be substituted without exceeding the scope of the invention.

Image processing module 103, field extraction module 123, data sequencing module 143, data entry module 163 and data association module 183 may be implemented on one single physical server, multiple servers, virtual servers, distributed servers, or any combination thereof.

Alternate embodiments of the invention that implement image processing module 103 in hardware, firmware, or a combination of hardware and software, as well as distributing the modules and/or the data in a different fashion will be apparent to those skilled in the art and are also within the scope of the invention. Image processing module 103 may process data in a serial or parallel fashion, or a combination of the two, without departing from the spirit or scope of the invention.

Alternate embodiments of the invention that implement field extraction module 123 in hardware, firmware, or a combination of hardware and software, as well as distributing the modules and/or the data in a different fashion will be apparent to those skilled in the art and are also within the scope of the invention. Field extraction module 123 may process data in a serial or parallel fashion, or a combination of the two, without departing from the spirit or scope of the invention.

Alternate embodiments of the invention that implement data sequencing module 143 in hardware, firmware, or a combination of hardware and software, as well as distributing the modules and/or the data in a different fashion will be apparent to those skilled in the art and are also within the scope of the invention. Data sequencing module 143 may process data in a serial or parallel fashion, or a combination of the two, without departing from the spirit or scope of the invention.

Alternate embodiments of the invention that implement data entry module 163 in hardware, firmware, or a combination of hardware and software, as well as distributing the modules and/or the data in a different fashion will be apparent to those skilled in the art and are also within the scope of the invention. Data entry module 163 may process data in a serial or parallel fashion, or a combination of the two, without departing from the spirit or scope of the invention.

Furthermore, alternate embodiments of the invention that implement data association module 183 in hardware, firmware, or a combination of hardware and software, as well as distributing the modules and/or the data in a different fashion will be apparent to those skilled in the art and are also within the scope of the invention. Data association module 183 may process data in a serial or parallel fashion, or a combination of the two, without departing from the spirit or scope of the invention.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

The invention claimed is:

1. A computerized method for secure data entry, the method comprising:
   receiving an electronic image of an input page of a known type;
   identifying a data field image, wherein the data field image comprises an identified region of the input page;
   extracting data from data field image by electronic image recognition;
   sequencing the data extracted from the data field images;
   simultaneously displaying the data field image and extracted data from the displayed data field image, for manual approval of extracted data; and
   associating manually approved data with the input page.

2. The method of claim 1, further comprising subdividing data field images.

3. The method of claim 1, wherein electronic data field image files are transmitted to different physical locations for display.

4. The method of claim 1, further comprising distributing electronic data field image files across different display screens.

5. The method of claim 1, further comprising receiving manually corrected data.

6. The method of claim 5, further comprising displaying identical images on at least two display screens for manual approval or entry of data to verify accuracy of manually approved or entered data.

7. The method of claim 5, further comprising displaying images having a known value used for validating manually approved or entered data.

8. The method of claim 1, further comprising maintaining a range of acceptable values by data field type for flagging extracted data with unacceptable values.

9. The method of claim 1, further comprising mixing display of data field images from a first input page among data field images from multiple input pages.

10. A computerized method for secure data entry, the method comprising:
    receiving an electronic image of an input page of a known type;
    identifying regions on the input page based on an identified page type, wherein each region comprises a data field;
    identifying multiple electronic data field images, wherein each data field image comprises an identified region of the input page;
    associating identification data with each data field image;
    extracting data from data field images by electronic image recognition;
    sequencing data field images;
    simultaneously displaying at least one data field image and extracted data from the displayed data field image, for manual approval of extracted data;
    receiving a manual approval or disapproval of the displayed extracted data; and
    associating manually approved data with the input page.

11. The method of claim 10, further comprising displaying data field images in a reordered sequence.

12. The method of claim 10, further comprising receiving a manual data correction for disapproved data.

13. The method of claim 12, further comprising comparing manually entered data with data extracted by image recognition and flagging discrepancies.

14. The method of claim 10, wherein multiple data field images are displayed simultaneously.

15. The method of claim 10, further comprising processing the electronic image for clarity.

16. The method of claim 10, further comprising encrypting data field images for transmission.

17. The method of claim 10, wherein the input page contains data from a domain selected from the group consisting of tax, health care, government, accounting, finance, investment, banking, mortgage, employment, insurance, legal, education, and non-profit.

* * * * *